United States Patent [19]

Böhm

[11] Patent Number: 5,620,718

[45] Date of Patent: Apr. 15, 1997

[54] FIXING DEVICE FOR RELEASABLY FASTENING A TOOL MEMBER TO A FIXING PLATE IN AN INJECTION MOLDING MACHINE

[75] Inventor: Georg Böhm, Kirchenthumbach, Germany

[73] Assignee: Staubil & Trumpelt GmbH, Bayreuth, Germany

[21] Appl. No.: 439,935

[22] Filed: May 12, 1995

[30] Foreign Application Priority Data

Jun. 17, 1994 [EP] European Pat. Off. .............. 94109420

[51] Int. Cl.⁶ ............................................. B29C 45/66
[52] U.S. Cl. ................................... 425/190; 425/595
[58] Field of Search .................................. 425/190, 595

[56] References Cited

U.S. PATENT DOCUMENTS

| | | | |
|---|---|---|---|
| 3,595,126 | 7/1971 | Norton | 89/1.5 D |
| 3,762,264 | 10/1973 | Scott | 83/698 |
| 4,315,727 | 2/1982 | Black | 425/595 |
| 4,348,165 | 9/1982 | Vostrovsky | 425/185 |
| 4,372,738 | 2/1983 | Black et al. | 425/595 |
| 4,561,626 | 12/1985 | Black | 425/595 |
| 4,671,764 | 6/1987 | Hehl | 425/595 |
| 4,676,474 | 6/1987 | Vallet et al. | 249/68 |
| 4,790,739 | 12/1988 | Manfredi | 425/595 |

FOREIGN PATENT DOCUMENTS

| | | |
|---|---|---|
| 0025995 | 4/1981 | European Pat. Off. . |
| 0179724 | 4/1986 | European Pat. Off. . |
| 0488872 | 6/1992 | European Pat. Off. . |
| 2155486 | 5/1973 | France . |
| 3100854 | 8/1982 | Germany . |
| 3817109 | 12/1988 | Germany . |
| 2938665 | 3/1991 | Germany . |
| 603194 | 6/1948 | United Kingdom . |
| 1206411 | 9/1970 | United Kingdom . |

*Primary Examiner*—Tim Heitbrink
*Attorney, Agent, or Firm*—Finnegan, Henderson, Farabow, Garrett & Dunner

[57] ABSTRACT

A device for an injection molding machine for releasably fastening a tool member to a fixing plate. The device includes a profiled part provided either on the fixing plate or on the tool member and a fixing element attached to the other component and provided with engaging members adapted to be moved relative to the profiled part and be brought into engagement with it to fasten the tool member and fixing plate together. The engaging members are one or more elongated carrier members that are brought into engagement with a profile on the profiled part, and a locking component is provided, displaceable in the longitudinal direction of the carrier members to move the carrier members into engagement with the profiled part.

15 Claims, 12 Drawing Sheets

FIXING DEVICE FOR RELEASABLY FASTENING A TOOL MEMBER TO A FIXING PLATE IN AN INJECTION MOLDING MACHINE

BACKGROUND OF THE INVENTION

The present invention refers to a fixing device for an injection moulding machine for releasably fastening a tool member to a fixing plate, comprising a profiled part provided either on said tool member or on said fixing plate and a fixing element attached to the respective other component and provided with engaging members which are adapted to be moved relative to said profiled part and which are adapted to be brought into engagement with said profiled part.

In injection moulding machines, an exchangeable injection moulding tool is supported between two fixing plates which are disposed in opposite relationship with each other. A fixing device for an injection moulding machine is known e.g. from German patent application DE-A-29 38 665. The fixing device known from said German patent application includes a fixing plate having an insertion opening for a projecting flange provided on the tool member. In the interior of said insertion opening, two radially displaceable clamping jaws are provided, which are disposed in opposite relationship with each other and which engage behind the inserted flange. The clamping jaws are adapted to be displaced hydraulically by means of a hydraulic unit. For the purpose of fixing the tool member, the flange is introduced in the insertion opening of the fixing plate, whereupon the hydraulically operated clamping jaws engage behind said flange and secure it in position.

In the field of injection moulding machines, it is generally aimed at providing a fixing device which is easy to handle but nevertheless adapted to be precisely adjusted and by means of which tools can be exchanged rapidly and easily. In addition, it is particularly important that the fixing device permits a high degree of compatibility with various injection moulding tools having different base plates. Other known fixing systems, in the case of which several clamping claws engage behind the edges of the tool base plate for the purpose of fixing, entail restrictions with respect to their compatibility with different tools. In order to eliminate these restrictions, it has hitherto been known to use adapter plates which, however, involve great expense.

It is the object of the present invention to provide a fixing device for an injection moulding machine, which has been improved in comparison with the prior art and which permits tool members to be attached to fixing plates rapidly and accurately.

SUMMARY OF THE INVENTION

In accordance with the present invention, this object is achieved by means of a fixing device of the type mentioned at the beginning, which is characterized by the features that the engaging members comprise one or more elongate carrier members adapted to be brought into engagement with the profile of the profiled part, and that a locking component is provided, which is adapted to be displaced in the longitudinal direction of said carrier members and by means of which the engaging members can be secured at their position of engagement with said profiled part.

In view of the fact that a locking component is provided for securing the engaging members at their position of engagement with the profiled part, a reliable connection between the tool members and the fixing plates is guaranteed. The connection between the two components is easy to establish. In order to establish this connection, the tool members and the fixing plates, respectively, are moved relative to one another at right angles to the direction of the fixing plates until the engaging members are located opposite the profiled part, said engaging members being then locked at this position by a movement of the locking component. A connection of high closing force can be established with only little expenditure of energy for displacing the locking component. Neither difficult nor complicated movements of the parts to be interconnected are necessary.

In accordance with an advantageous further development, the carrier members are adapted to be deflected transversely to their longitudinal direction, and a transverse deflection is directed transversely to the direction of movement of said locking component. It is thus possible to construct the mechanism for moving the locking component such that it is adapted to take up comparatively weak forces applied thereto during the fixing operation, since essentially stronger forces, which may occur at the engaging members during the fixing operation, can only be transmitted transversely to the direction of movement of the locking component and are taken up by the material of said locking component, consequently.

According to an additional advantageous further development of the present invention, the carrier members are resiliently deformable. The fact that the carrier members are resilient provides the advantage that the engaging members can be moved in a simple manner without any joints or the like being required. A simple and cost-saving structural design of the fixing element is thus achieved. In accordance with a particularly advantageous embodiment, the resiliently deformable carrier members are constructed such that, when they are in engagement with the profile of the profiled part, they are in a condition in which no bending force is applied thereto. This has the effect that the carrier members are adapted to have applied thereto a higher holding force, since no bending force will additionally be super-imposed on the tension in said carrier members. On the other hand, this also has the effect that the carrier members can be provided with less compact dimensions.

In accordance with an additional advantageous further development of the present invention, the locking component and/or the engaging member have provided thereon sliding surfaces having a structural design of such a nature that a movement of said locking component will cause a deflection of said engaging members transversely to the direction of movement of said locking component. This will have the effect that in particular resiliently deformable carrier members are deflected by a displacement of the locking component into the locking position, whereupon they are brought into engagement with the profile and simultaneously secured at their position in the profile.

In accordance with an additional advantageous further development, a spring device is provided, which is effective between the locking component and the engaging members in the direction of a mutual displacement; it will be advantageous when said spring device is arranged such that it is pretensioned towards the locking position of the piston. This causes a self-locking effect which prevents the connection from being released without any active actuation of the locking component.

In a further embodiment, the locking component and the engaging members have provided thereon friction surfaces, which abut on one another at a locking position, in such a way that, at said locking position, the locking component is adapted to be locked by a frictional force acting between said friction surfaces. Also this produces a self-locking effect with respect to the movement of the locking component, said self-locking effect preventing the engagement from being released without pretensioning by means of an additional spring device or the like being necessary.

In an additional advantageous further develoment of the present invention the fixing element and/or the profiled part are adapted to be displaced relative to each other. It is thus possible to integrate the fixing element in a fixing plate as well as the profiled part in a tool member in such a way that in a retracted condition of the fixing element and of the profiled part, respectively, no parts will protrude beyond the opposite surfaces of said fixing plate and of said tool member. For establishing an engagement between the engaging members provided on the elongate carrier members of the fixing element and the profile of the profiled part, said fixing element and said profiled part are—starting from the retracted position—displaced relative to each other until the engaging members are located opposite the profile of the profiled part. This embodiment has the great advantage that, due to the smooth surfaces of the fixing plate and of the tool member which are located in opposite relationship with each other and which do not show any protruding parts whatsoever, an essentially simplified manoeuverability, especially a simplified manoeuverability of heavy tool members, is possible.

In an additional particularly advantageous further development, the fixing device according to the present invention is adapted to be hydraulically actuated. This provides the advantage that the fixing operation can easily be automatized, whereby the fixing of tool components to an injection moulding machine can be carried out more easily and more rapidly and whereby costs can be saved.

BRIEF DESCRIPTION OF THE DRAWINGS

In the following, the present invention will be explained and described in detail on the basis of graphic representations of embodiments and with reference to the drawings, in which.

DETAILED DESCRIPTION OF THE INVENTION

Figure 1:
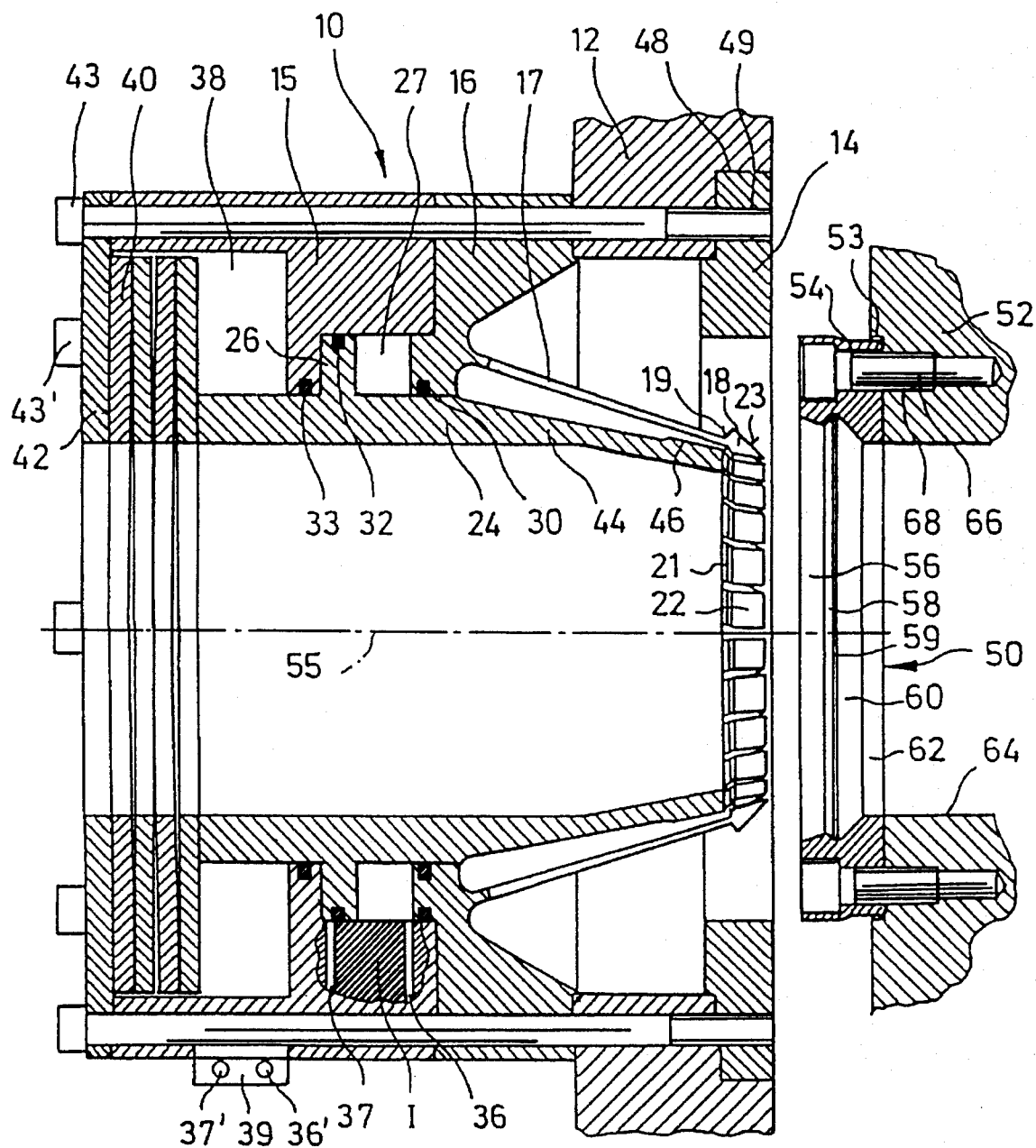
FIG. 1 shows a cross-sectional view of a first embodiment of the fixing device according to the present invention in an unlocked position.

FIG. 1 shows an embodiment of a fixing device according to the present invention comprising a fixing element 10 which is attached to a fixing plate 12 and which is adapted to be connected to a profiled part 50 attached to a tool member 52.

The profiled part 50 consists of a fixing ring 54 whose interior surface 62 has a profile constructed like an outwardly directed groove, and which consists of annular surfaces 56, 58, and 60. Annular surfaces 58 and 60 are inclined relative to one another forming an annular groove 59 therebetween and annular surface 56 conically widens toward the entrance end of the profiled part. The fixing ring 54 is secured in position by means of a screw connection 66 in an adequate tapped hole 68 of the tool member 52. The outer diameter of the fixing ring 54 is fitted in a backlash-free manner into a centering hole 53 provided on said tool member 52.

The fixing element 10 comprises a plurality of comparatively thin, resiliently deformable, elongate carrier members in the form of self-supporting, cantilevered arms 17 at the end of which hooks 18 are provided, which serve as engagement elements used for engaging the profile of the fixing ring 54. Instead of hooks, it is also possible to provide notches in said arms; in this case, it will be necessary to adapt the profile of the fixing ring by forming a complementary projection thereon. The arms 17 are connected to an annular body 16, said annular body 16 bordering on the fixing plate 12 with its end face directed towards the fixing ring, whereas the opposite side thereof borders on an additional annular fixing element body 15. The arms 17 can be formed integrally with said annular body 16 by jointly producing said arms and said annular body from one workpiece. The arms 17 may, however, also be produced separately and attached to the annular body 16 by soldering or by welding or by means of a screw connection or an articulated joint. Furthermore, the annular body 16 and the fixing element body 15 may also consist of a single component.

The annular body 16 and the fixing element body 15 are secured to the fixing plate 12 by means of a screw connection 43. In the embodiment shown, the fixing element body 15 and the annular body 16 are mounted by means of the screw connection 43 between the fixing plate 12 and an end plate 42 concentrically with a centering hole 48 of a centering ring 14 provided on the fixing plate.

The arms 17 on the annular body 16 are constructed such that they define together an essentially conically tapering hollow cylinder. The hooks provided at the ends of the cantilevered arms are provided with an inwardly projecting sliding surface 21 which slopes at an oblique angle towards the inner surface of the arms 17 and which is followed by a contact surface 22 extending essentially along the direction of the arms. On the outer side, which is located opposite said interior contact surface 22, the hooks 18 have an outwardly projecting friction surface 19 extending at an oblique angle relative to the longitudinal direction of the arms 17. This friction surface 19 is followed by an additional surface 23 defining together with the opposite contact surface 22 e.g. a tip. It is evident that, instead of a tip,.the end of the hook 18 may also have a different shape. The shape of the hook 18 is adapted to the profile of the profiled part 50.

A cylindrical piston 24, which is adapted to be axially moved at right angles to the surface of the fixing plate and which acts as a locking component, is provided in the interior of the annular body 16 and the conical circumferential surface of the cylinder defined by the arms 17. At the side facing the arms, the piston 24 has a tapering section 44. At the end of the section 44, a sliding surface 46 is formed. The outside diameter at the end of the tapering section 44 of the piston 24 lies between the inner and outer diameters of an imaginary annular surface which is defined by the sliding surfaces 21 formed on the hooks. In a central area, the piston 24 has an annular shoulder 26 between two sliding areas. A chamber 27 is formed between the annular shoulder 26, the annular fixing element body 15 and the annular body 16. Packing rings 30, 33 and 32 are provided on the respective sliding surfaces on the inner side of the annular body 16 and on the inner side of the fixing element body 15 as well as on the outer side of the annular shoulder 26. Two passages 36 and 37 open into the chamber 27, said passages communicating with line connections 36' and 37' provided on a connecting piece 39. The chamber 27 is subdivided into two subchambers by the annular shoulder 26, each of said subchambers being connected to one of the fluid passages 36 and 37. Said passages 36 and 37, which do not extend in the cutting plane according to FIG. 1, are made visible through section I broken away in the graphic representation according to FIG. 1.

Between the fixing element body 15 and the end plate 42, an additional chamber 38 is defined. Said chamber 38 has provided therein spring means such as a Belleville spring 40 acting between the end plate 42 and the opposite end face of the piston 24. At the position shown in FIG. 1, the Belleville spring 40 is in a pretensioned condition. Instead of a Belleville spring as the spring means, it would just as well be possible to use helical springs, spiral springs or leg springs.

At the position of the piston 24 shown in FIG. 1, at which the Belleville spring 40 is pretensioned, the front outer edge is located at the tapering end of the sliding surface 46 at a position at which it is disposed opposite the sliding surfaces 21 formed on the hooks. This is the unlocked position of the hooks 18 provided on the arms 17. The arms 17 are not deformed at this position.

Figure 2:
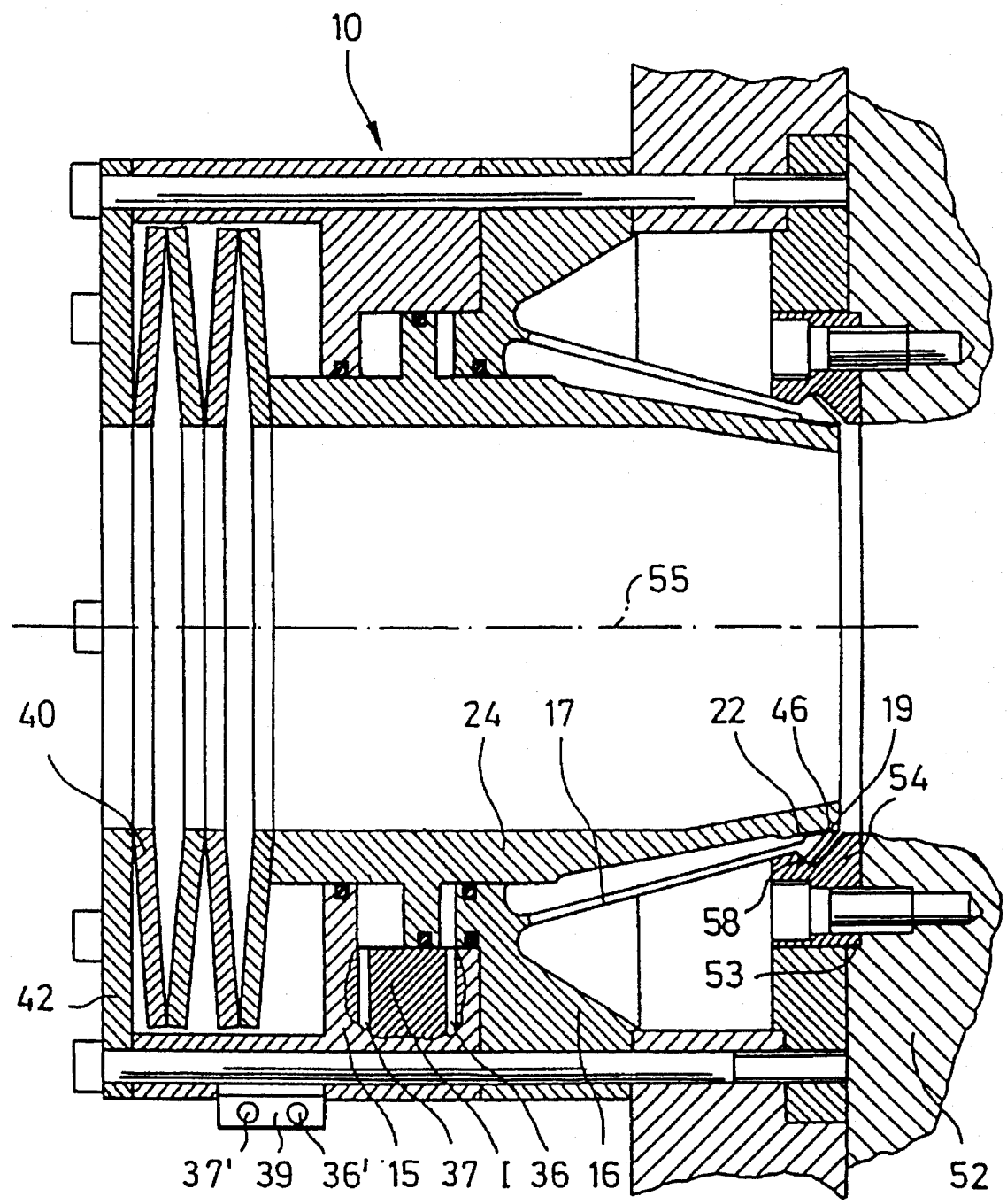
FIG. 2 shows a cross-sectional view of the embodiment shown in FIG. 1, in a locked position.

At the second position of the fixing element according to FIG. 1, which is shown in FIG. 2, the spring device 40 is in a partially released condition, the piston 24 being displaced in the axial direction 55 relative to the condition shown in FIG. 1. The conical sliding surface 46 at the end portion of the tapering section 44 of the piston 24 abuts on the contact surfaces 22 of the hooks 18.

At the position shown in FIG. 2, the profiled part 50 is inserted in a centering opening formed in the centering ring 14. The hooks 18 of the fixing element 10 engage the profile of the profiled part 50. In this condition, the friction surfaces 19 of the hooks 18 abut with the surface 58 of the profile. The hook surface 23 and the profile surface 60 opposite surface 58 of the profiled part 50 have preferably formed between them a small air gap. Also the end of the arm 17 following the hook 18 should be prevented from abutting on the inner surface 56 of the profiled part, which conically widens towards the fixing element, so as to permit permanent readjustment of the engaging members in the profile by the force of the spring applied to the piston.

Figure 3:
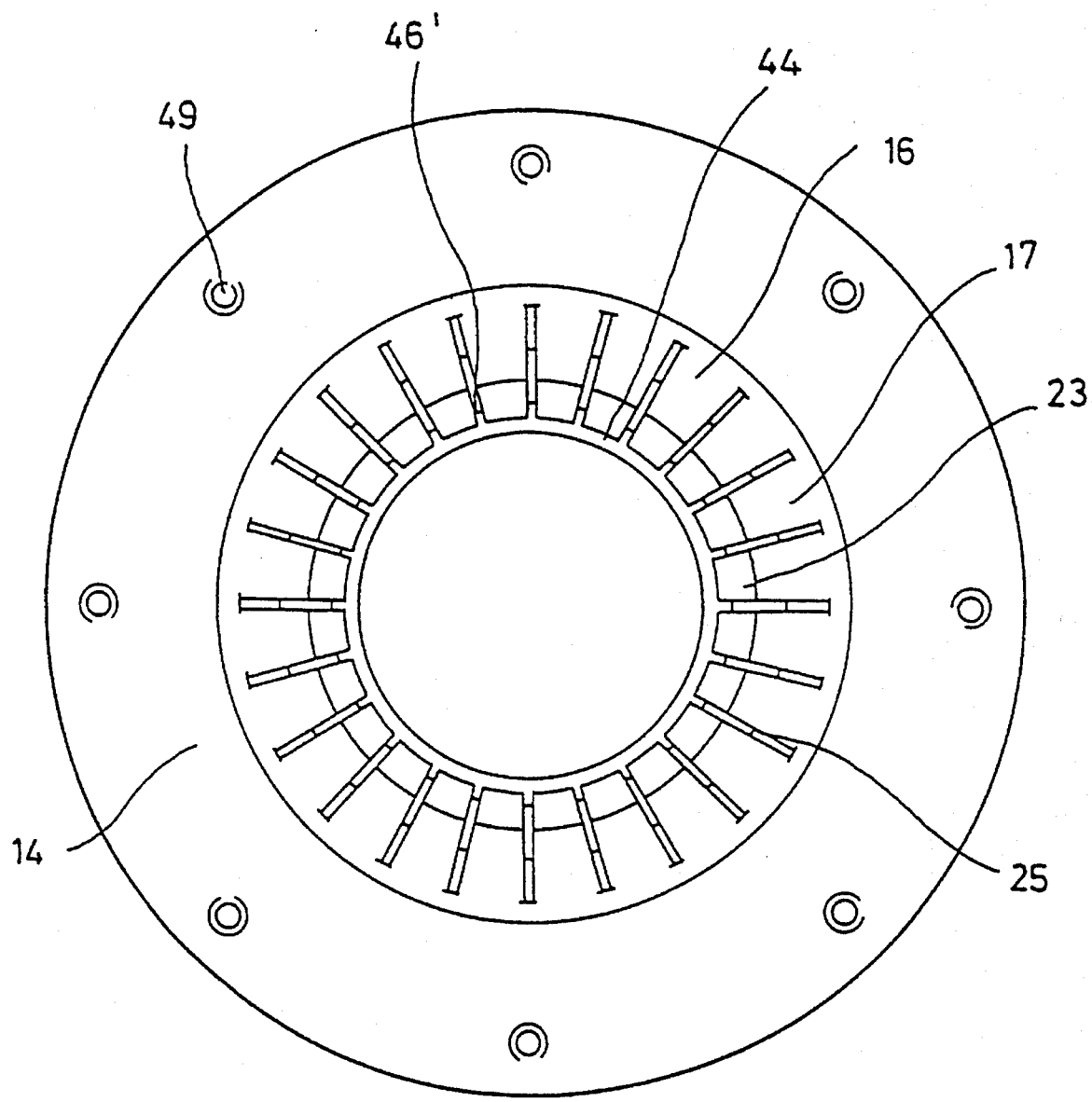
FIG. 3 shows a view of the fixing element of the fixing device from the side of the profiled part.

The shape and the mutual structural design of the pairs of abutting surfaces 19 and 58 as well as 46 and 22 is chosen such that the profiled part 50 will positively be held in the opening of the centering ring 14 in a backlash-free manner. Depending on the outside diameter of the sliding surface 46, the shape of the hooks, in particular that of the sliding surfaces 21, is chosen such that, when the piston 24 is displaced in the axial direction, the arms will be spread in an appropriate manner so as to achieve positive fixing of the profiled part. FIG. 3 shows a view of the fixing element 10 from the side of the profiled part. The members of the fixing element 10 are rotationally symmetrical with respect to the axis 55. The arms 17 are formed by a corresponding number of radial incisions 25 in the conical outer surface of a cylinder, said conical outer surface being defined on the annular body 16. The centering ring 14 has formed therein holes 49 which are provided with a female thread and which have attached thereto the screw connections 43 for fastening the fixing element 10 to the fixing plate 12. The annular body and the arms 17 with the engagement hooks 18 provided thereon can easily be produced as a lathe work; for the purpose of forming the arms, it will suffice to provide radial incisions in the annular body 16. The fixing element 10 just as the profiled part 50 have a central, axial through hole. This through hole permits passage of e.g. a pressure pipe for the injection moulding compound which is to be injected into the tool member.

For explaining the mode of operation of the fixing device according to the present invention, reference is again made to FIGS. 1 and 2. In a released and locking condition of the fixing device, the piston 24 of the fixing element 10 occupies a position at which the sliding surface 46 of the piston 24 abuts on the contact surfaces 22 of the hooks. The spring device 40 is partially released in this condition. The annular shoulder 26 formed on the outer circumference of the piston 24 divides the chamber 27 into two subchambers; a fluid passage 36 and 37, respectively, ends in each of said subchambers. This position of the piston 24 with respect to the arms and hooks is shown in FIG. 2. For releasing the fastening of the profiled part 50 or for establishing such a fastened condition, the piston 24 is moved to the position shown in FIG. 1 by applying pressure with suitable hydraulic means to chamber 27 via passage 36 while pretensioning the spring device 40. The application of pressure can be effected e.g. by opening a valve, which is not shown in the drawings, and by supplying a pressurized hydraulic fluid. At this position, the conical end of the piston 24 is displaced to the back relative to the hooks 18 of the arms 17, which, consequently, occupy their forcefree normal position. At this forcefree normal position, the maximum outer diameter of the hooks, which occurs at the edge between the subsurfaces 19 and 23, is smaller than the minimum interior diameter of the profile of the fixing ring 54 occurring at the edge between the areas 56 and 58. It is thus possible to introduce and remove the fixing ring along the direction of the axis 55 without having to overcome any resistance. Due to the inherent elasticity of the arms 17, said arms 17 and the hooks 18 attached thereto will return automatically to the non-engaging position, at which it is possible to introduce and remove the fixing ring without having to overcome any resistance, when the piston 24 is pulled back. On the one hand, this has the advantage that no devices whatsoever are necessary in order to establish an engagement-releasing position of the arms in the retracted condition of the piston 24. On the other hand, there is, however, the disadvantage that at the position of engagement a possible tension in the arms 17 may be superimposed by a bending force due to the fact that said arms are deflected by the piston 24 into the position of engagement. The axial holding force of the arms 17 as a whole will thus be reduced accordingly. If the arms 17 are formed integrally with the annular body 16 from a single workpiece, it will be necessary to remachine the hooks 18 at the deflected position of engagement so as to achieve an adaptation of the surfaces on the hooks 18 to the countersurface in the profile of the profiled part 50 at the deflected position of engagement.

In order to provide a fixed connection between the fixing plate 12 and the tool member 52, the hooks are brought into engagement with the profile of the fixing ring 54. For this purpose, the application of pressure to chamber 27 is discontinued so that the pretension of the spring device 40 will displace the piston 24 along the axis 55 in the direction of the fixing ring 54. In the course of this displacement, the outer end edge of the conical area 46 of the piston 24 will first come into contact with the sliding surfaces 21 of the hooks 18. Due to the pretension of the spring device 40, the elastically deformable arms 17 are deflected outwards until the end edge of the conical area 46 has moved over the sliding surface 21 with simultaneous spreading of the arms 17. Finally, a positive connection will be achieved when the continued axial movement of the piston 24 results in a position of the pairs of friction surfaces 46 and 22 as well as 19 and 58 at which any amount of backlash is eliminated. The areas of the arms 17 following the hooks 18 do not abut on the conically widening annular surface 56 of the fixing ring 54 so as to permit permanent readjustment. Due to the fact that the arms 17 are resiliently deformable and due to the fact that the hooks 18 and the arms 17 have an appropriate shape, the hooks can adjust themselves to possibly existing angular errors in the pairs of friction surfaces 46 and 22 as well as 19 and 58.

In view of the fact that the fixing ring 54 is fitted into the centering opening of the centering ring 14, it will suffice to secure the fixing ring 54 in position relative to the fixing element 10 only in the direction of the axis 55. An axial tractive force acting on the tool member 52 and, consequently, on the fixing ring 54 results in a force component which occurs at the sliding surfaces 19 and 58 and which is directed radially inwards as well as in an axial force component. Due to the locking effect produced by means of the piston 24 abutting via its sliding surface 46 on the inner contact surfaces 22, the hooks 18 are prevented from swerving inwards. The axial tractive forces are taken up by the arms 17. The comparatively strong radial forces, which occur in the friction surfaces of the hooks 18, can easily be taken up by the sturdy structural design of the piston 24. The structural design which has been chosen and in the case of which the spring device 40 is pretensioned at the unlocked position results in a self-locking effect in the locked condition because an active application of pressure is necessary for moving the piston 24 away from the spread hooks 18. As soon as the application of pressure is discontinued, the spring device 40 will automatically urge the piston 24 into the locking position. This will eliminate the risk of an unintentional release of the fastening in the case of a possible failure of the hydraulic system which actuates the fixing element.

A similar self-locking effect may, on the other hand, be achieved by an adequate structural design of the pair of friction surfaces 46 and 22. For this purpose, it would be necessary that the friction surface of the pair of friction surfaces 46 and 22 encloses in a direction opposite to the direction of displacement of the locking component an angle which is so small that the frictional force acting between the friction surfaces will lock the locking component at a locking position. For this purpose, the condition $$\alpha < \arctan \mu$$

must be fulfilled, $\alpha$ being the angle enclosed by the friction surface and the direction of movement of the locking component and $\mu$ being the coefficient of friction of the friction surfaces. If steel is used for both friction surfaces 46 and 22, the angle $\alpha$ will approximately be 6°. In view of the fact that a spring which produces a self-locking effect and which is pretensioned in the direction of the locked condition is not provided in this case, it will, on the other hand, be necessary to permit actuation of the piston 24 in both directions, e.g. by providing the fluid chamber 27 with two passages.

In addition, the structural design of the pairs of friction surfaces 19 and 58 as well as 46 and 22 essentially facilitates the opening of a fixing element which has been in a self-locked condition for a prolonged period of time.

Figure 4:
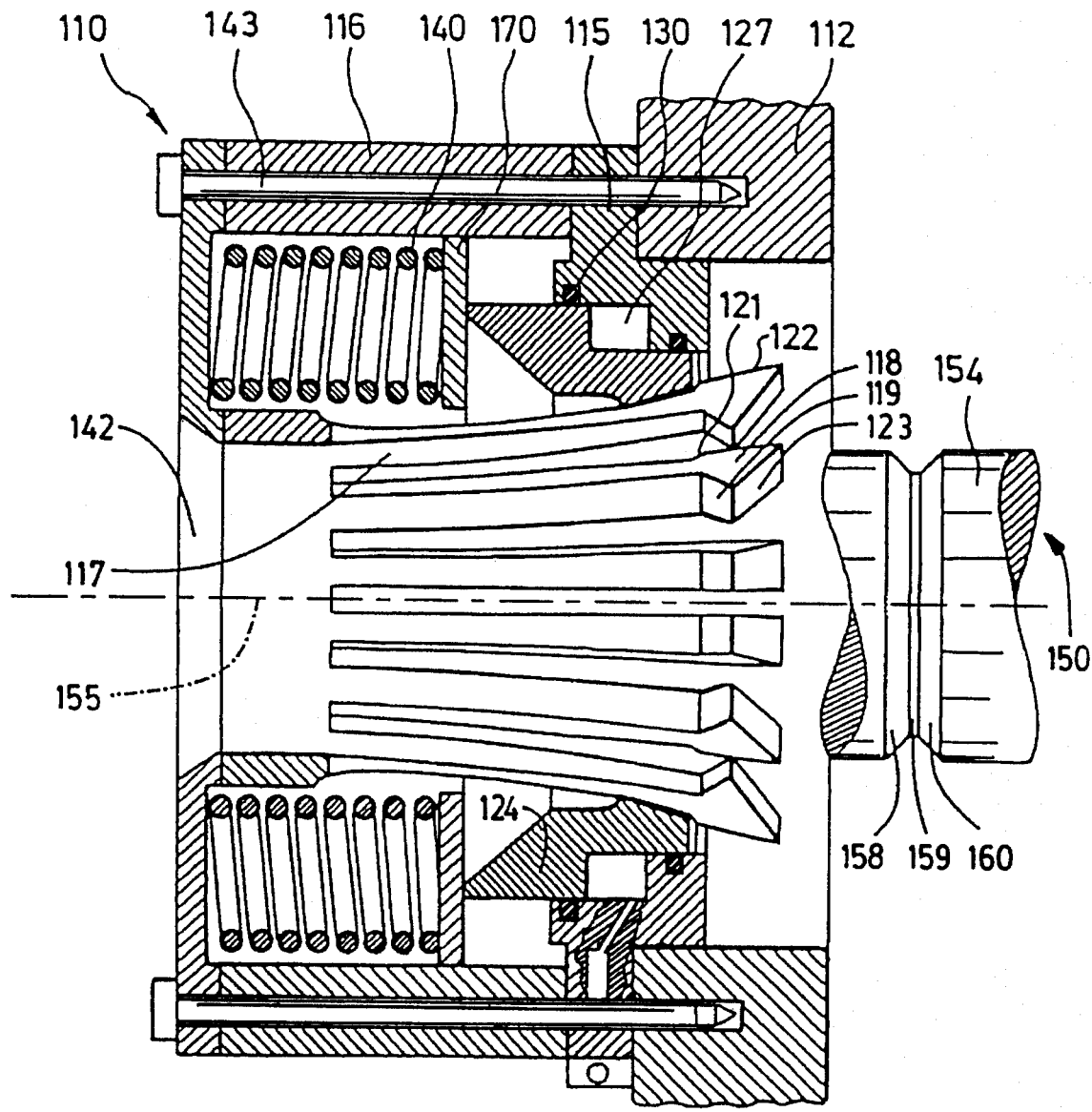
FIG. 4 shows a cross-sectional view of a second embodiment of the present invention, in a unlocked position.
Figure 5:
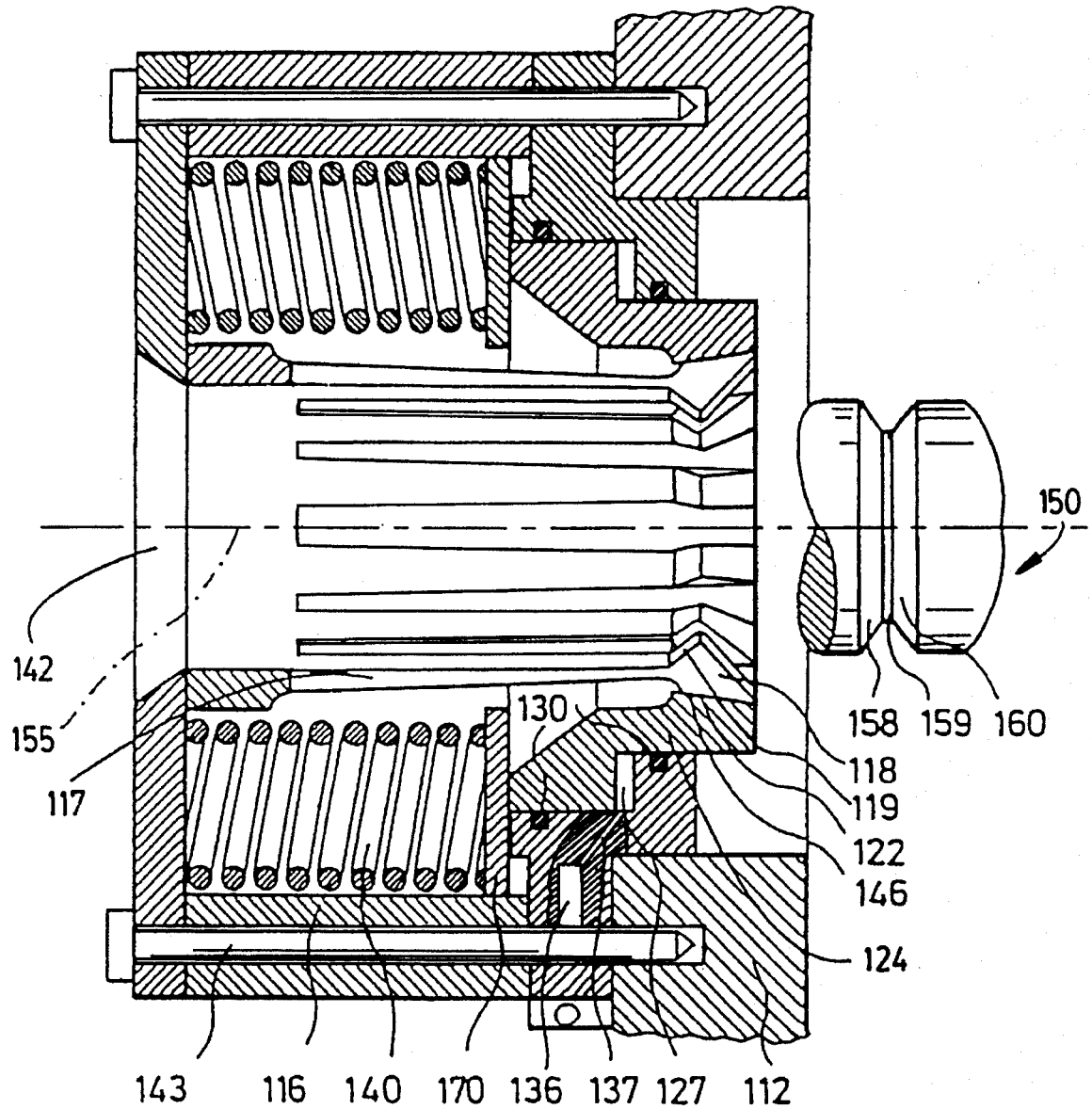
FIG. 5 shows a cross-sectional view of the embodiment shown in FIG. 4, in a locked position.

FIGS. 4 and 5 show an additional embodiment of the fixing device according to the present invention. The fixing device comprises a fixing element 110 and a fixing rod 150 which is adapted to be secured to said fixing element 110. The fixing element 110 is attached to a fixing plate 112 via a screw connection 143. The fixing rod is aligned along an axis 155 and the outer surface thereof is provided with a profile in the form of a groove, said profile being composed of successive annular surfaces 158, 159 and 160 which are inclined reative to one another. The fixing element 110 is provided with a cavity which extends along the axis 155 and into which the fixing rod 150 is adapted to be inserted. An annular body 116 has provided thereon elongate carrier members or arms 117 which are aligned essentially along said axis and the free ends of which are provided with hooks 118. Due to their elongate, comparatively slender shape, the arms 117 are resiliently deformable. The arms 117 are arranged in such a way that they essentially define a hollow cylinder slotted in the axial direction.

The hooks 118 include friction surfaces 119 adjoining the inner surfaces of the arms and enclosing an angle therewith, said friction surfaces 119 essentially giving the hooks the hook shape projecting towards the inside. The adjoining surface 123 encloses an angle with the friction surface 119. Opposite to the hook shape defined by the surfaces 119 and 123, a sliding surface 121 is formed, which adjoins the arm 117 and which is followed by a contact surface 122. A hollow piston 124 is arranged such that the arms 117 are surrounded. The piston 124 is adapted to be displaced in the axial direction. The outer circumferential surface of the piston 124 is composed of two cylindrical sliding surfaces which have different diameters and between which an annular shoulder is formed. An outer, annular fixing element member 115 is arranged opposite the annular shoulder of the piston 124, said fixing element member 115 having on the inner cylinder walls thereof two cylindrical sliding surfaces with different diameters defining an annular shoulder. The sliding surfaces provided on said annular fixing element member 115 and the piston 124 define a sliding bearing. A chamber 127 is formed between the annular shoulders, said chamber 127 being adapted to be acted upon by a pressurized medium via a passage 137 and a connection hole 136. The sliding surfaces of the annular fixing element member 115 are provided with packing rings 130 arranged at both sides of the chamber 127.

The end of the piston 124 facing the hook 118 is provided with a conically widening friction surface 146 in the inner wall surface thereof.

At the opposite end, a pressure plate 170 is provided, which transmits to the piston 124 the force of springs 140 provided between a closure plate 142 and said pressure plate 170. The springs are arranged in such a way that they will be pretensioned when the pressure plate 170 is moved in the direction of the closure plate 142. The springs are preferably spiral springs whose wire thickness is larger than the maximum distance between individual turns so that, if fracture of a turn should occur, the wire cannot penetrate between the turns. In view of the fact that the two fragments can, consequently, not intertwine in case fracture of a turn should occur, a failure of the spring function of such compression springs will thus be prevented if unnoticed spring fracture occurs. It will be advantageous to arrange a plurality of springs such that they are symmetrical with respect to the axis 155. It would also be possible to use springs which are fitted into each other.

In FIG. 5, the fixing element disclosed in FIG. 4 is shown at a position at which the piston 124 is displaced axially in the direction of the fixing rod 150, whereby the friction surface 146 on the inner surface of the piston 124 comes into contact with the contact surfaces 122 of the hooks 118. At this position, the arms 117 are deflected inwards contrary to their elastic force so that the inside width of the hooks in their entirety, which is determined by the interior hook ends, is reduced in comparison with the position according to FIG. 4. The arrangement of the piston 124 and of the arms having hooks 118 attached thereto is dimensioned such that, at the free position shown in FIG. 4, the interior diameter of the front inner edge of the piston is smaller than the outside diameter of an imaginary circular ring defined by the successive ascending sliding surfaces 121 on the hooks 118. It follows that, when the piston is displaced in the axial direction, the front inner edge of the cylindrical piston will come into contact with the sliding surfaces 121 of the hooks 118 which will thus be deflected radially inwards together with the arms 117.

In FIG. 4, the fixing device is shown in the condition in which the piston 124 releases the engagement of the hooks 118 and in which it is, consequently, possible to insert the fixing rod 150 in and to remove it from the fixing element 110 without having to overcome any resistance. At the engagement-releasing position, the arms 117 are in a non-deflected condition in which no bending force is applied thereto. It follows that, when the piston 124 is retracted, the arms 117 will automatically return to this engagement-releasing position. Just as in the case of the preceding embodiment, it would, on the other hand, also be imaginable to construct the arms in such a way that, when they occupy the position of engagement, they are in a non-deflected condition in which no bending force is applied thereto. When unlocking is effected by drawing back the piston 124, the arms 117 would, in this case, not swerve to the engagement-releasing position, i.e. the removal and the insertion of the fixing rod would necessitate the application of a force for the purpose of spreading the arms. On the other hand, the arms would, in this case, permit the application of higher loads for a tractive force acting in the direction of the arms, since no additional bending force is superimposed at the position of engagement. Moreover, it would not be necessary to subject the arms to remachining at the position of engagement for the purpose of adapting the surfaces of the hooks 118 to the profile of the fixing rod 150.

Just as the embodiment according to FIGS. 1 and 2, also the embodiment according to FIGS. 4 and 5 is provided with a self-locking effect for unlocking the fixing element due to the force permanently applied by the springs 140. For unlocking the hooks in the fixing element, it is necessary to apply pressure to chamber 127 in the embodiment shown in FIGS. 4 and 5 so as to actively displace the piston 124 against the force of the spring 140.

Figure 6:
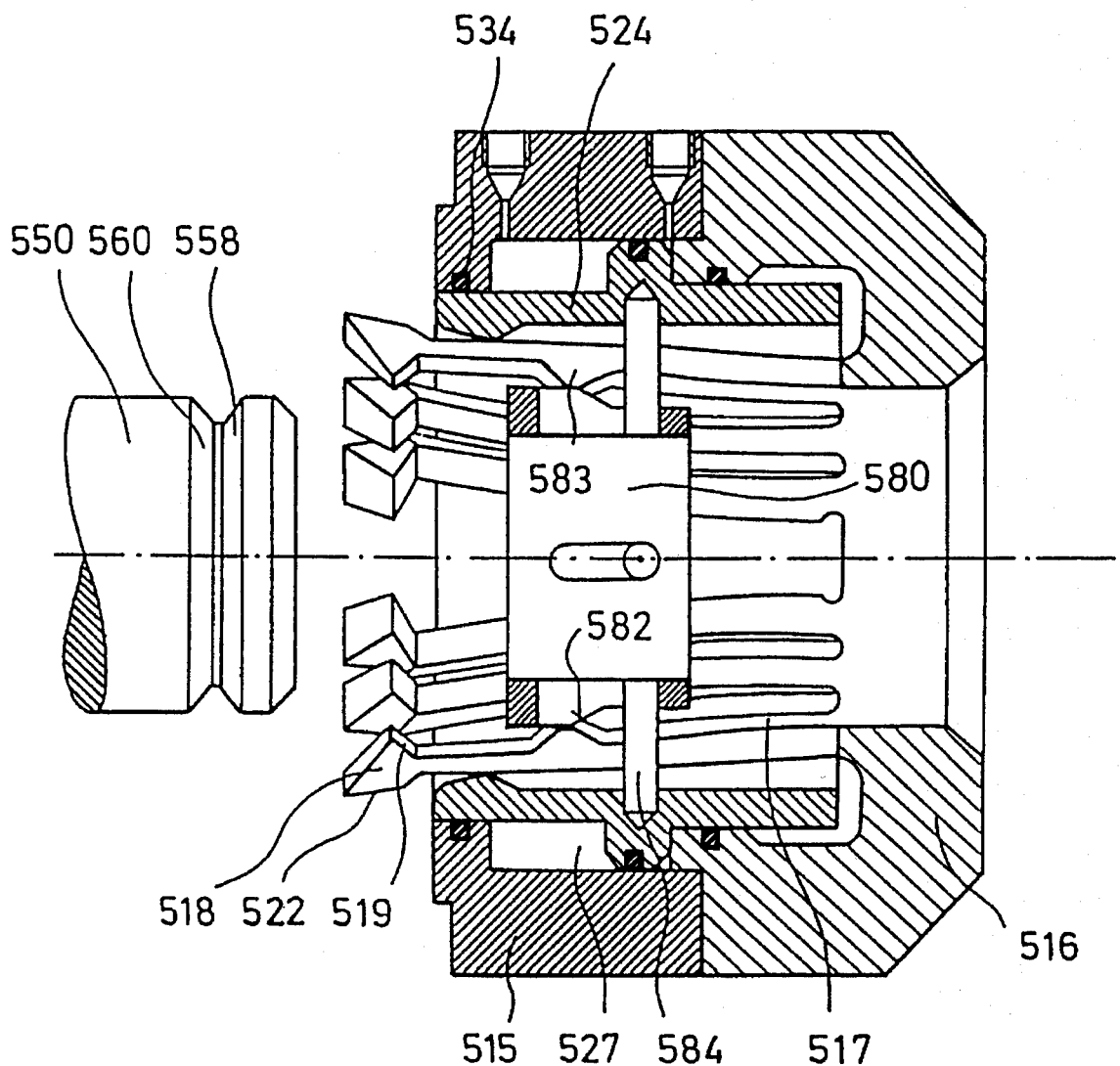
FIG. 6 shows a cross-sectional view of an additional embodiment of the present invention, in a unlocked position.
Figure 7:
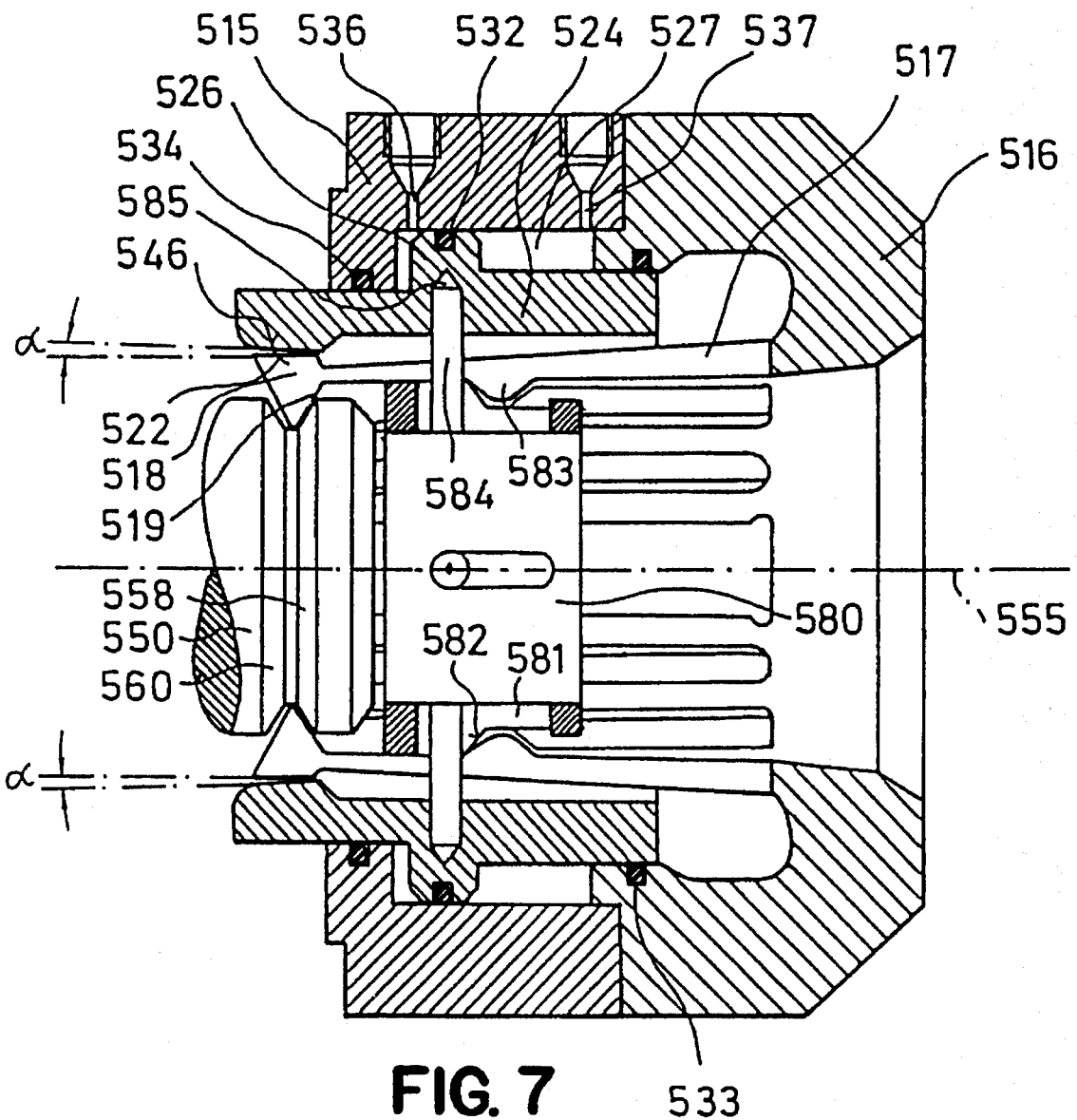
FIG. 7 shows a cross-sectional view of the embodiment shown in FIG. 6, in a locked position.

FIGS. 6 and 7 show a cross-section of an additional embodiment of the fixing device according to the present invention at an unlocked, engagement-releasing position and at a locked position, respectively. Just as in the case of the preceding embodiments, the embodiment shown in FIG. 6 includes a fixing rod 550 with annular surfaces 558 and 560 which are inclined relative to each other and which define a groove, said groove being adapted to be engaged by hooks 518 formed on resiliently deformable elongate carrier members or arms 517. In the embodiment shown, the arms 517, which are provided on an annular body 516, are constructed such that, at the engagement-releasing position shown in FIG. 6, they have a bending force applied thereto and are radially deflected so as to provide an inside width which is defined between the interior hook ends and which is larger than the outside diameter of the fixing rod so that it is possible to insert and remove the fixing rod without having to overcome any resistance. For spreading the arms 517 at this unlocked position, a retracting device is provided, which comprises an interior sleeve 580 adapted to be displaced along the direction of a piston 524, said interior sleeve 580 being actuated via driving pins 584 by means of the locking component in the form of the piston 524. The arms 517 are arranged between the interior sleeve 580 and the piston 524. The driving pins 584 provided in holes 585 of the piston 524 extend into elongated holes 581 formed along the direction of displacement of said interior sleeve 580. The outside diameter of the interior sleeve 580 is provided with an annular shoulder 582 ascending at an oblique angle. The arms 517 are additionally provided with projections 583 which protrude inwards and which slide up and down on said annular shoulder 582 when the interior sleeve 580 is moved along an axial direction 555. In this embodiment, a chamber 527, which is adapted to be acted upon by a pressurized fluid, is provided with two passages 536 and 537, which end at the respective axial ends of the chambers and which each communicate with a tapped hole for a pressure pipe. It follows that, when pressure is applied through a respective one of the two passages 536 and 537, the piston 524 can be displaced in the respective direction along the axis 555 to the locked position and to the engagement-releasing position.

FIG. 7 shows this additional embodiment at the position of engagement at which friction surfaces 519 formed on the hooks 518 are in contact with the respective opposite friction surface 558 of the fixing rod 550. At this position of engagement, the arms 517 are in a condition in no bending force is applied thereto.

When chamber 527 has pressure applied thereto via the passage 536 and when passage 537 is simultaneously opened, the piston 524 will be displaced from the position shown in FIG. 7 to the unlocked position according to FIG. 6, the interior sleeve 580 being displaced simultaneously via the driving pins 584. In the course of this process, the projections 583 on the arms 517 will slide into contact with the annular shoulder 582 of the interior sleeve 580, whereby the arms 517 will be spread outwards. Due to the fact that elongated holes 581, which are engaged by the pins 584, are formed, it is possible to provide the interior sleeve 580 with a more compact structural design having shorter dimensions in the axial direction.

A retracting device for the hooks would also be imaginable in connection with an embodiment according to FIGS. 1 and 2.

In the embodiment shown in FIG. 7, friction surfaces 522 and 546, which are formed on the hooks 518 and the piston 524 and which are in contact with one another at the position of engagement, are constructed in such a way that an angle α formed between this common contact or friction area and the direction of displacement of the piston 524 is so small that a self-locking effect of the locking component will be produced at the locked position when a tractive force is applied. Due to the small angle α, an axially directed component of the friction force on the pair of friction surfaces 522 and 546 exceeds an axial force acting on the piston 524 due to the angle α when a tractive force is applied to the fixing rod in a direction opposite to the fixing element. In order to permit such a self-locking effect, it is necessary that the angle α is smaller than the arctan μ, μ being the coefficient of friction of the pair of friction surfaces 522 and 546. When both friction surfaces of said pair of friction surfaces consist of steel, this angle α, which is the maximum permissible angle for the self-locking effect, is approximately 6°.

Figure 8:
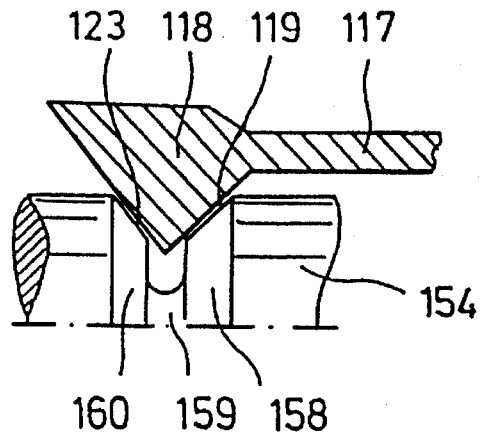
FIGS. 8–10 show schematic sketches for explaining the possible modes of engagement between the engaging members and the profile of the profiled part.
Figure 9:
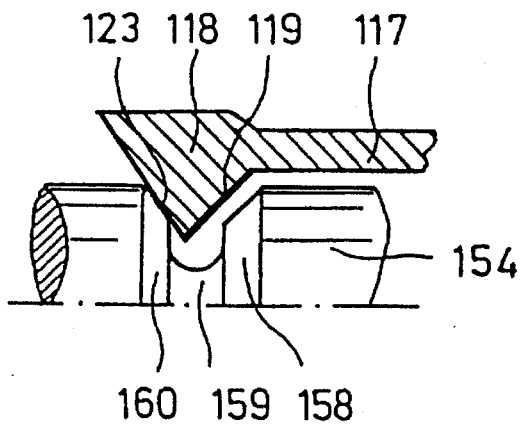
Figure 10:
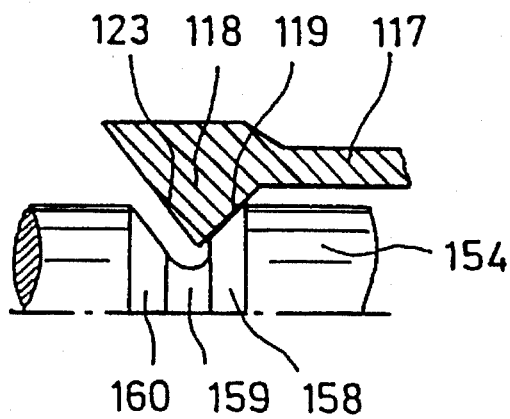

FIGS. 8 to 10 show the different modes of engagement between the hooks 118 and the profile of the fixing element 150. In FIG. 8, a positive engagement between the hooks 118 and the profile of the fixing rod 154 is shown, this type of positive engagement having, however, the disadvantage that automatic readjustment is not possible. Such a backlash-free mode of engagement would be particularly suitable for a rod coupling.

The modes of engagement shown in FIGS. 9 and 10 are advantageous in comparison with the above-mentioned mode of engagement, since permanent readjustment is here effected when a piston 124 is provided which is pretensioned towards the locked position. This will have the effect that manufacturing tolerances or possible wear, which may occur when the fixing device is in use, are automatically compensated for. Depending on the arrangement of the hooks relative to the profile in the fixing rod, a clamping force directed away from the the fixing element (FIG. 9) or a clamping force directed towards the fixing element (FIG. 10) can be achieved. The shape of the arms 117 and of the hooks 118 permits a resilient deformation when pressure acting towards the inside is applied by means of the piston 124; said resilient deformation can result in an adaptation of the corresponding friction surfaces 119 and 158 as well as 123 and 160, if any angular errors should occur between these friction surfaces.

Figure 11:
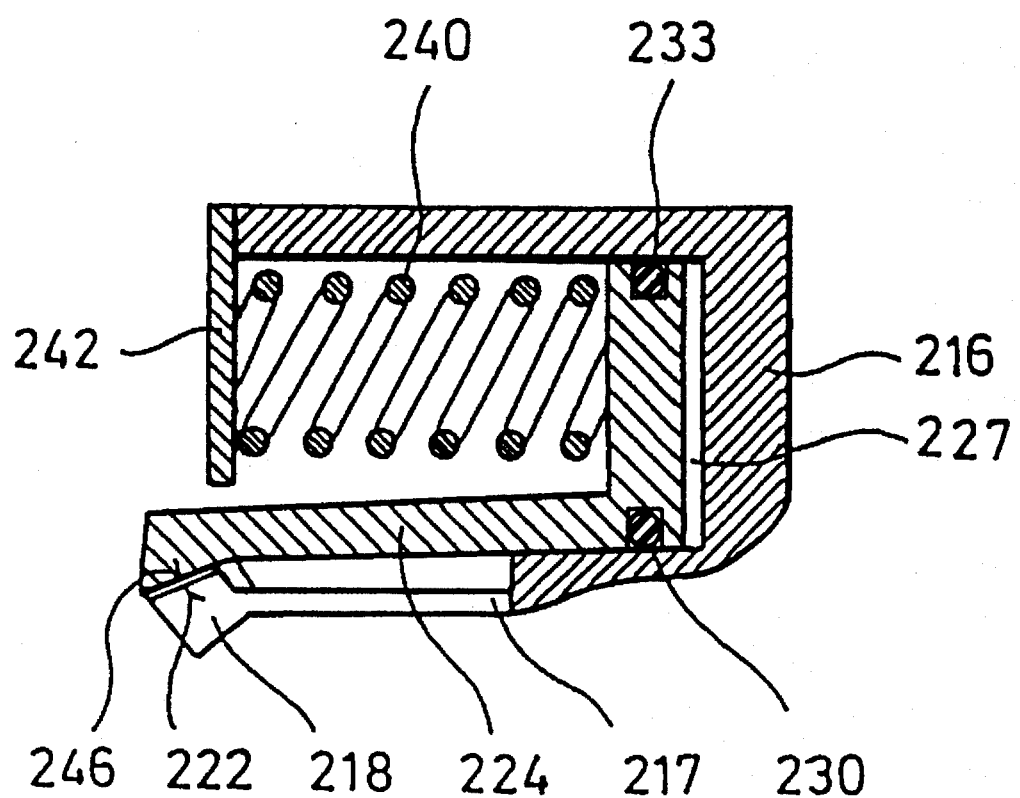
FIG. 11 shows a simplified cross-sectional view of part of a fixing element of a fixing device which has been modified still further.

FIG. 11 is a schematic representation of a modification of the fixing element shown in FIG. 4. In this embodiment, a spring 240 is effective between an end plate 242 and an annular flange formed on a cylindrical piston 224. Packing rings 230 and 233 are arranged on the outer and inner cylindrical sliding surfaces of the annular flange. The annular flange and an annular body 216, on which the arms 217 are provided, have again formed between them a chamber 227 into which a pressurized medium can be introduced. When said chamber 227 has pressure applied thereto, the piston 224 is adapted to be displaced against the force of the spring 240 in the direction of the arms 217. In the locked condition shown in FIG. 11, a sliding surface 246, which is formed in the inner circumferential surface such that it is inclined relative to the axial direction, is in contact with complementary contact surfaces 222 provided on the hooks 218. In the embodiment shown, the sliding surfaces 246 and the contact surfaces 222 are constructed such that, in contrast to the embodiments described hereinbefore, a movement of the piston 224 towards the inside will result in a deflection of the arms 217 and in locking of the hooks. A movement of the piston 224 towards the outside will have the effect that the hooks 218 are unlocked and released, said hooks 218 moving outwards (upwards in the drawing according to FIG. 11) due to the resilient deformation force of the arms 217 so as to enlarge the inside width determined by the hooks projecting inwards so that it is possible to introduce and remove the fixing rod without having to overcome any resistance. Also in this case, it would be possible to construct the arms 217 in such a way that, when they occupy the position of engagement, no force is applied thereto. A self-locking effect is again produced by the force of the spring 240. The self-locking effect may also in this case be produced by the suitable structural design of the pairs of friction surfaces which has been described hereinbefore.

Figure 12:
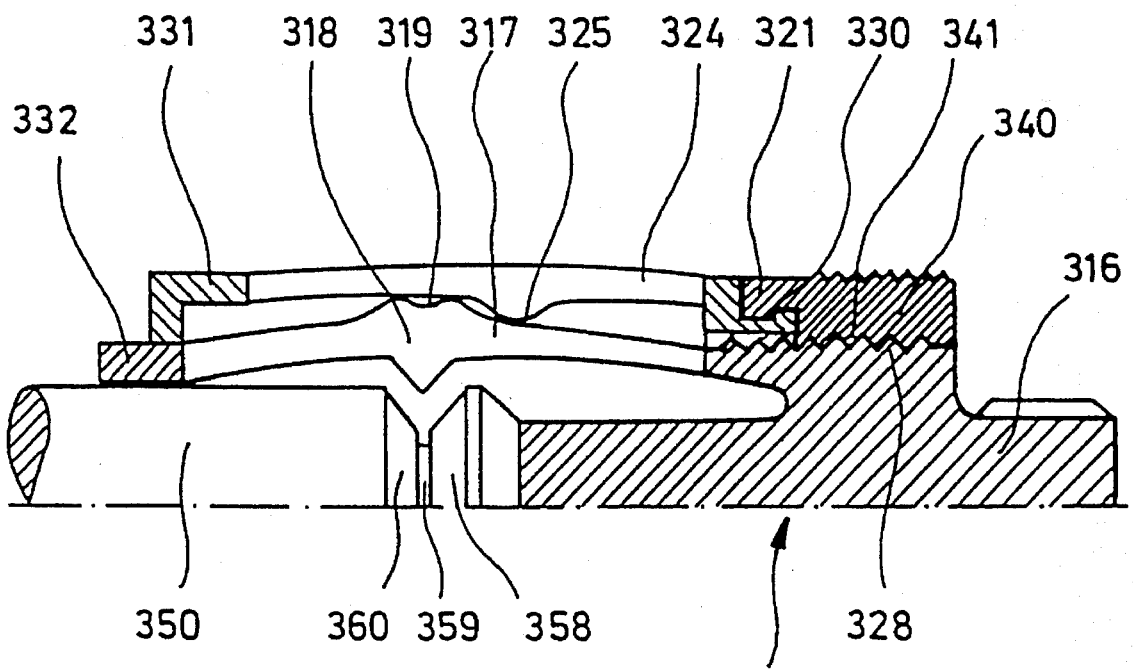
FIG. 12 shows a simplified fragementary cross-sectional view of an additional, manually operable embodiment of the fixing device.
Figure 13:
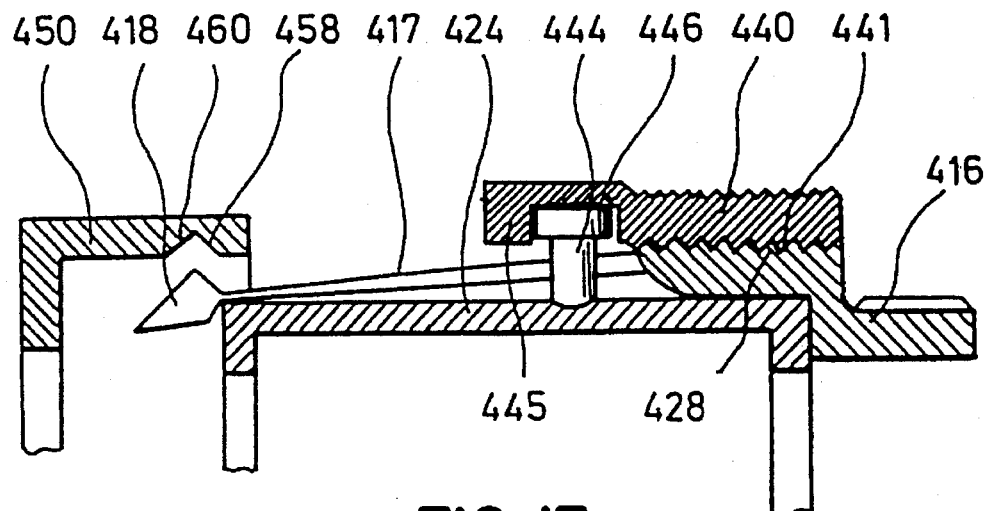
FIG. 13 shows a simplified cross-sectional view of a subsection of a modified, manually operable embodiment of the fixing device according to the present invention.

FIGS. 12 and 13 show additional embodiments for a fixing device according to the present invention, said embodiments being provided with devices which are used for manual operation.

The fixing device, part of which is is shown in a schematic, cross-sectional view in FIG. 12, comprises a fixing rod 350 having provided thereon a groove-shaped profile defined by the annular surfaces 358, 359 and 360. A fixing element 310 is located opposite said fixing rod 350, said fixing element 310 having provided thereon resiliently deformable elongate hook carriers 317 which are arranged on a fixing element body 316. Although only one hook carrier is shown in FIG. 12, it will be expedient to provide, just as in the case of the preceding embodiments, a plurality of hook carriers which are arranged in a cylinder-symmetrical mode of arrangement with respect to the axis in the longitudinal direction. The hook carriers 317 have in a central area thereof a projection 318 protruding inwards, which is positioned such that it is located opposite the groove of the fixing rod 350 and which is provided with suitable surfaces for engaging said groove on the fixing rod 350. The engaging projection 318 is provided approximately in a central area of the hook carriers 317. The free ends of the hook carriers 317 engage an annular body 332, said annular body 332 having an interior diameter which is adapted to the outside diameter of the fixing rod 350. The hook carriers may also be produced by cutting from a hollow cylindrical body in such a way that an annular body which is formed integrally with the hook carriers remains at the free end thereof. The inner surface of the annular body 332 cooperates with the free ends of the hook carriers and acts as a guide means for introducing the fixing rod 350 into the fixing element 310. In addition, the annular body 332 acts as a support for the projecting end of the hook carriers 317. The individual hook carriers 317 have a hump 319, which is positioned opposite the engaging projection 318 and which may have provided therein a locking recess.

A slotted locking sleeve 324 is provided such that it encompasses the hook carriers 317 on the outside thereof, an annular shoulder 325 being formed on the inner surface of said locking sleeve 324. Due to the slotted structural design, the locking sleeve is adapted to be resiliently deformed in the area of said annular shoulder 325. The shape and the size of said annular shoulder 325 are adapted to the hump 319 on the hook carrier 317. One end of said locking sleeve 324 rests on the annular body 332. The other end of said locking sleeve 324 is in frictional engagement with a union nut 340 via hook-shaped axial extensions 321 and 330 which are bent towards each other. The union nut 340 has a female thread 341 which is in engagement with a male thread 328 formed on the fixing element body 316. The union nut 340 is in sliding frictional engagement with the locking sleeve 324.

Rotation of said union nut 340 results in a displacement in the axial direction according to the thread pitch, the entrained locking sleeve 324 being axially displaced as well. This has the effect that the shoulder 325 migrates along the hook carriers 317 to the hump 319, and this will cause a deflection of the arms 317 towards the inside. Due to the resilient deformability of the locking sleeve, the humps can reliably be brought into engagement with and snapped in position in said annular shoulder. In addition, this will also have the effect that manufacturing tolerances are compensated for. Due to this deflection of the hook carriers 317, the engaging projection 318 is brought into engagement with the groove formed in the fixing rod 350.

An additional embodiment of a manually operated fixing device according to the present invention is shown in FIG. 13.

A profiled part 450 comprises a hollow cylindrical portion, the inner surface of said hollow cylindrical portion being provided with a groove formed by the annular surfaces 458 and 460. Just as in the case of the embodiment according to FIG. 1, a hook 418 formed on an arm 417 is located opposite said groove. On the inner side of the arms 417, a cylindrical piston 424 is arranged, said piston 424 being adapted to be displaced in the axial direction. A male thread 428 is provided on an annular body 416 having attached thereto the arms 417. A female thread 441, which is provided on a union nut 440, engages said male thread 428. The union nut 440 is provided with a hollow cylindrical extension 445 having formed therein a radial groove 446. A rod 444, which is connected to the piston 424, is guided in said groove.

Rotation of the union nut 440 results in a displacement of said union nut in the axial direction due to the effect produced by the screw thread, the rod 444, which engages the groove 446, being entrained in the axial direction and causing a movement of the piston 424 relative to the hooks 418. The arms are laterally deflected so that the hooks come into engagement with the profile and are locked by the piston 424 at this position of engagement.

Fixing devices according to FIGS. 4 to 7, 12 and 13 are suitable to be used as rod couplings, especially when the forces occurring are predominantly forces acting in the axial direction.

Figure 14:
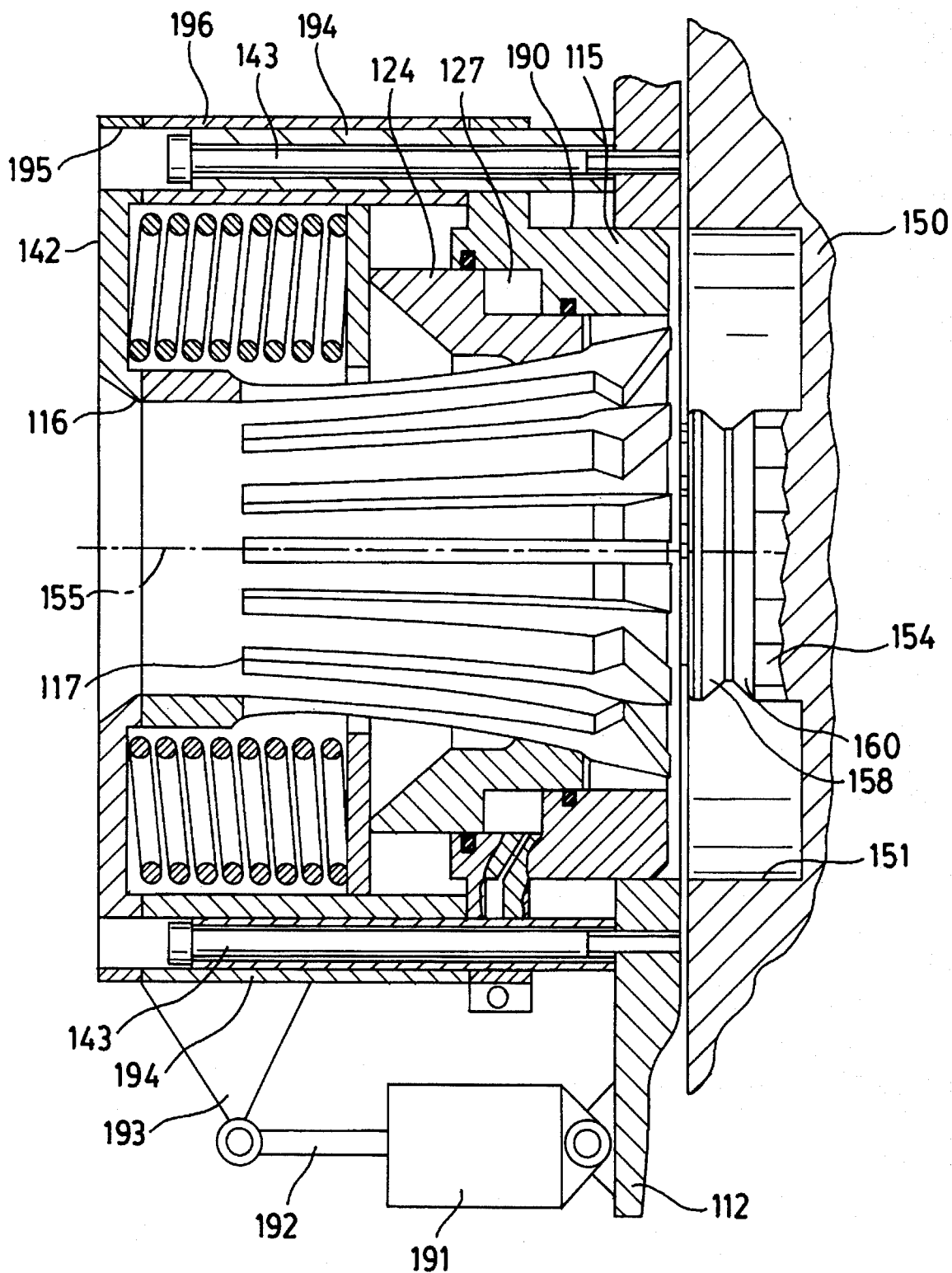
FIG. 14 shows a further development of the embodiment shown in FIG. 4, in the unlocked, non-engaging position.
Figure 15:
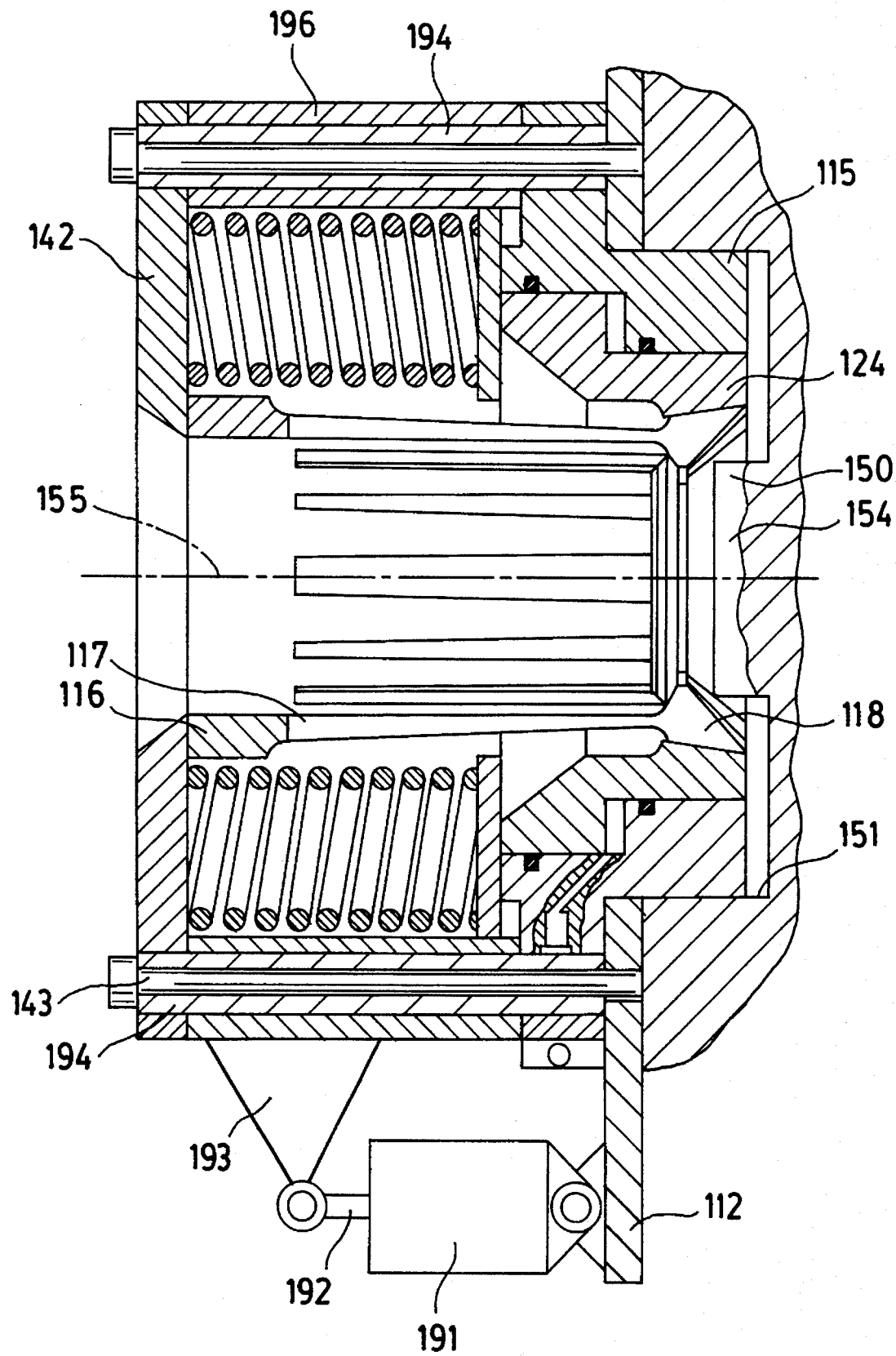
FIG. 15 shows the embodiment according to FIG. 14, in a engaging and locked position.

An additional embodiment of the fixing device according to the present invention, which represents a modification of the embodiment disclosed in FIGS. 4 and 5, is shown in FIGS. 14 and 15. This modified embodiment shown in FIGS. 14 and 15 differs from the embodiment according to FIGS. 4 and 5 with regard to the fact that the fixing element attached to the fixing plate 112 is adapted to be displaced relative to the profiled part 154 provided on the tool member 150. Furthermore, the profiled part 154 is arranged on said tool member 150 in a recess 151, which is provided in said tool member 150, in such a way that no parts project beyond the surface of the tool member 150 which faces the fixing plate 112. The modified embodiment of the fixing element is provided with a fixing element body 115, which is adapted to the diameter of the centering opening in the fixing plate 112 and which is partially accommodated therein, said fixing element body 115 being provided with outer sliding surfaces 190 e.g. in the embodiment shown; when the fixing element is displaced in the direction of the profiled part, said outer sliding surfaces 190 cause said fixing element to be guided in said centering opening provided in the fixing plate 112. In addition, the fixing element body 115 is connected to a housing component 196 which encloses together with the end plate 142 the springs, the annular body 116 with the elongate carrier 117 and the locking component 124 so as to define an independent unit. The housing component 196 and the fixing element body 115, by way of example, can be an integral part produced from one workpiece. Holes 195 are formed in said housing component 196. Sliding sleeves 194, which are secured to the fixing plate 112 via screw connections 143, are provided in said holes 195, the housing component 196 and, consequently, the whole unit of the fixing element being adapted to be slidingly displaced on said sliding sleeves. Said sliding sleeves 194 and the sliding surfaces 190 act together as a guide means for the fixing element; if the fixing element body 115 had a different structural design, said sliding sleeves would, however, also be able to fulfil this function alone. The sliding sleeves 194, which are arranged at right angles to the fixing plate, permit the fixing element to be displaced in the direction of the axis 155.

The housing component 196 is connected to a piston 192 via fastening means 193, said piston 192 being adapted to be displaced via a hydraulic cylinder 191 attached to the fixing plate 112. It follows that hydraulic actuation of the piston 192 will have the effect that the fixing element is displaced along the direction of movement permitted by the sliding sleeves 194. Instead of the external cylinder 191 provided with a piston 192, it would also be possible to provide an integrated arrangement in the interior of the fixing element. Instead of a displacement of the fixing element, it would also be possible to construct the profiled part 154 such that it is adapted to be displaced on said tool member 150. Furthermore, an embodiment would be imaginable which comprises a displaceable fixing element as well as a profiled part which is adapted to be displaced relative to said fixing element. Just as in the case of the preceding embodiments, it would again be possible to modify the embodiment shown in such a way that it is provided with a hook retracting device, and the technical modification for providing a displaceability of the fixing element, which is shown in FIG. 14, may just as well be provided in the embodiment shown in FIGS. 1 and 2.

Whereas FIG. 14 shows the fixing element in a condition in which it is retracted relative to the profiled part 154, FIG. 15 shows the fixing element in a condition in which it is extended relative to said profiled part, the hooks 118 being additionally in engagement with the profile of the profiled part 154 and secured in their position of engagement by the locking member 124 which has additionally been displaced relative to said profiled part.

The modification shown in FIGS. 14 and 15 including a fixing element which is adapted to be displaced relative to the profiled part offers the great advantage that the tool member can be attached to the fixing plate in such a way that portions protruding beyond the opposite surfaces of said components will be avoided in the case of both said components. Especially when very heavy tool members or tools are installed in or removed from injection moulding machines, the manoeuverability of the tools in tool-changing operations will thus essentially be facilitated and improved, whereby tool-changing operations can, on the one hand, be carried out more rapidly and whereby damage to the tools and the fixing plate can, on the other hand, be avoided to a very large extent.

The preceding embodiments shown in FIGS. 1 to 15 show the advantage that the influence of temperature variations is minimized. In view of the fact that the hook arms are held under pretensioned deformation when they are at the locked position, environmental temperature influences will affect the fixing force only to a minor extent.

Furthermore, the fixing devices according to the present invention are advantageous with respect to their small structural size. The structural arrangement of the arms and especially the fact that said arms are constructed without any joints result in a small structural size and in low production costs. In view of the fact that the arms are adapted to be flexibly deflected, the individual parts of the fixing element can be mounted without any difficulties. The individual components of the fixing device essentially consist of lathe work, which can be produced at a reasonable price and with high accuracy. The fixing arms are produced by means of radial incisions from a turned, conical hollow cylinder provided with areas which are suitable to be used for the hooks. For achieving an accurate adaptation to the profile, the hooks are subjected to remachining at the deflected position.

Due to the provision of a plurality of arms having hooks formed thereon, it will be guaranteed that the fixing element functions reliably even if one hook arm should break.

The embodiment shown in FIGS. 1 and 2 permits a tool member to be fixed and to be centered simultaneously. In this case, it will not be necessary to use more than a single fixing device for attaching a tool member to a fixing plate.

It is, however, also possible to provide several fixing devices, e.g. in accordance with the embodiment shown in FIGS. 4 and 5 as well as FIGS. 6 and 7, e.g. at the corners of a tool base plate, whereby rapid fastening with simultaneous adjustment as well as with a determination of the angular position of the tool relative to the fixing axis would be possible.

All the fixing devices shown have the advantage that the profiled parts which are to be provided on the tool member, and there especially on the tool base plate, project very little. This permits an easy manoeuverability of the tool members, which are occasionally very heavy, when said tool members are attached to the fixing plates, and a full utilization of the maximum space available between said fixing plates.

The fixing device according to the present invention is suitable to be used for injection moulding machines as well as for other apparatus provided with exchangeable tools, e.g. for presses and punching machines. Existing older machines can have added thereto the fixing system according to the present invention without any difficulties, since, once the machine has been reset, the associated tools can easily be provided with the necessary fixing rings at a reasonable price.

I claim:

1. A fixing device for an injection molding machine for releasably fastening a tool member to a fixing plate, said device comprising a profiled part having a profile on one of said fixing plate and said tool member and a fixing element attached to the other of said fixing plate and said tool member, said fixing element having a plurality of elongated carrier members extending in a longitudinal direction and moveable relative to said profiled part between a disengaged position where the members are disengaged from the profiled part to thereby release the tool member from the fixing plate and an engaged position where the members are engaged with the profile of said profiled part to thereby fasten the tool member to the fixing plate, a locking component displaceable in a first direction in the longitudinal direction of said carrier members for moving said carrier members into the engaged position and in an opposite second direction to allow said carrier members to return to their disengaged position, said locking component having a sliding surface sloping in the direction of displacement of the locking component for sliding engagement with a compatible first sliding surface on said carrier members to form a first pair of sliding surfaces so that as the locking component is displaced in said first direction, said carrier members are moved into said engaged position and said carrier members having a second sliding surface sloping in the direction of displacement of the locking component for sliding engagement with a compatible sloping surface on the profile of said profiled part to form a second pair of sliding surfaces, and pretensioning means acting on the locking component for urging said locking component in said first direction and said carrier members into their engaged position, said pairs of sliding surfaces being held in abutting frictional contact by the protensioning means to hold the tool member to the fixing plate while permitting adjustment for variations between the fixing element and the profile of the profiled part.

2. The fixing device of claim 1, wherein the carrier members move in a direction transverse to their longitudinal direction between said disengaged and engaged positions and transverse to the direction of movement of said locking component.

3. The fixing device of claim 2, wherein the carrier members are resiliently deformable.

4. The fixing device of claim 3, wherein said resiliently deformable carrier members are biased toward their disengaged position, said carrier members in their disengaged position being essentially in a condition in which no bending force is applied thereto.

5. The fixing device of claim 3, wherein said resiliently deformable carrier members are biased toward their engaged position, said carrier members in their engaged position being essentially in a condition in which no bending force is applied thereto.

6. The fixing device of claim 5, including deflection means for aiding the deflection of said carrier members transverse to their longitudinal direction toward their disengaged position.

7. The fixing device of claim 1, wherein the profiled part and the carrier members are essentially annularly symmetrical.

8. The fixing device of claim 2, wherein the carrier members are arranged around the outside of the locking component and are engageable with an inwardly directed profile on the profiled part.

9. The fixing device of claim 2, wherein the carrier members are arranged around the inside of the locking component and are engageable with an outwardly directed profile on the profiled part.

10. The fixing device of claim 1, wherein the fixing element and the profiled part each include a through hole, said through holes communicating with one another when the tool member is fastened in the fixing plate.

11. The fixing device of claim 1, wherein the fixing element and the profiled part are adapted to be displaced relative to each other.

12. The fixing device of claim 1, wherein the fixing element and profiled part are simultaneously centered relative to each other when the tool member is fastened to the fixing plate.

13. The fixing device of claim 1, wherein said pretensioning means comprises a spring device acting on the locking component for moving said locking component in said first direction and said carrier members into their engaged position.

14. The fixing device of claim 1, wherein said pretensioning means comprises hydraulic means acting on the locking component, said hydraulic means including a first chamber adjacent said locking component adapted to be filled with a pressurized fluid for moving said locking component in said first direction and said carrier members into their engaged position.

15. The fixing device of claim 14, including a second chamber adjacent said locking component adapted to be filled with a pressurized fluid for moving said locking component in said second direction.

* * * * *

UNITED STATES PATENT AND TRADEMARK OFFICE
CERTIFICATE OF CORRECTION

PATENT NO. : 5,620,718
DATED : April 15, 1997
INVENTOR(S) : George Böhm

It is certified that error appears in the above-indentified patent and that said Letters Patent is hereby corrected as shown below:

Title page, item [73], "Assignee: Staubil & Trumpelt GmbH" should read --Assignee: Stäubli GmbH--.

Signed and Sealed this

Twenty-eighth Day of October, 1997

Attest:

BRUCE LEHMAN

Attesting Officer

Commissioner of Patents and Trademarks